US010657313B2

(12) United States Patent
Marchsreiter

(10) Patent No.: US 10,657,313 B2
(45) Date of Patent: May 19, 2020

(54) METHOD AND SYSTEM FOR EDITING VIRTUAL DOCUMENTS

(71) Applicant: Smartwork Solutions GmbH, Munich (DE)

(72) Inventor: Christian Marchsreiter, Gilching (DE)

(73) Assignee: Smartwork Solutions GmbH, Munich (DE)

(*) Notice: Subject to any disclaimer, the term of this patent is extended or adjusted under 35 U.S.C. 154(b) by 218 days.

(21) Appl. No.: 15/264,151

(22) Filed: Sep. 13, 2016

(65) Prior Publication Data

US 2016/0378725 A1 Dec. 29, 2016

Related U.S. Application Data

(63) Continuation of application No. PCT/EP2015/052937, filed on Feb. 12, 2015.

(30) Foreign Application Priority Data

Mar. 18, 2014 (EP) ..................................... 14160413

(51) Int. Cl.
G06F 40/131 (2020.01)
G06F 40/166 (2020.01)
(Continued)

(52) U.S. Cl.
CPC .......... *G06F 40/131* (2020.01); *G06F 40/166* (2020.01); *G06F 40/197* (2020.01); *G06F 40/14* (2020.01)

(58) Field of Classification Search
CPC .. G06F 17/2229; G06F 17/24; G06F 17/3023; G06F 17/30309; G06F 17/228
See application file for complete search history.

(56) References Cited

U.S. PATENT DOCUMENTS 6,023,715 A * 2/2000 Burkes .................... G06F 17/21
715/207
6,301,592 B1 * 10/2001 Aoyama .................. G06F 8/71
715/229
(Continued)

FOREIGN PATENT DOCUMENTS

EP 1811399 A1 7/2007
GB 2409541 A 6/2005

OTHER PUBLICATIONS

Communication pursuant to Article 94(3) and EP Search Report for EP Application No. 14160413.2 dated Oct. 2, 2014, 10 pages.
(Continued)

*Primary Examiner* — Scott T Baderman
*Assistant Examiner* — Benjamin Smith
(74) *Attorney, Agent, or Firm* — Brake Hughes Bellermann LLP

(57) ABSTRACT

A computer system, computer implemented method and computer program product for editing virtual documents are discussed. The computer system includes a storage component configured to store a plurality of fragments associated with a virtual document that has a logical structure where each fragment is stored separately from the other fragments. Further, a processing component of the system is configured to assemble the virtual document by retrieving the plurality of associated fragments and ordering the plurality of associated fragments according to the logical structure. An editor component of the system is configured to present a visualization of the virtual document to a user for editing and to receive editing commands from the user wherein a specific editing command is configured to modify a specific fragment of the virtual document in the storage component.

17 Claims, 11 Drawing Sheets

(51) Int. Cl.
*G06F 40/197* (2020.01)
*G06F 40/14* (2020.01)

(56) References Cited

U.S. PATENT DOCUMENTS

| | | | | |
|---|---|---|---|---|
| 7,496,837 | B1* | 2/2009 | Larcheveque | G06F 17/2247 715/234 |
| 8,010,518 | B2* | 8/2011 | Petri | G06F 40/14 707/705 |
| 8,082,496 | B1* | 12/2011 | Leeds | G06F 17/2705 715/255 |
| 8,819,542 | B2* | 8/2014 | Cudich | G06F 40/106 715/243 |
| 9,852,117 | B1* | 12/2017 | Leschner | G06F 17/2288 |
| 9,875,228 | B1* | 1/2018 | Hall | G06F 40/177 |
| 2003/0121008 | A1* | 6/2003 | Tischer | G06F 17/2247 715/255 |
| 2004/0226002 | A1* | 11/2004 | Larcheveque | G06F 17/2247 717/126 |
| 2005/0091581 | A1* | 4/2005 | Bezrukov | G06F 17/2229 715/205 |
| 2005/0149861 | A1* | 7/2005 | Bishop | G06F 9/543 715/209 |
| 2007/0136662 | A1* | 6/2007 | Khaba | G06F 17/2229 715/202 |
| 2008/0091693 | A1* | 4/2008 | Murthy | G06F 17/30929 |
| 2008/0147957 | A1* | 6/2008 | Fujimaki | G06F 17/30914 711/100 |
| 2008/0201365 | A1* | 8/2008 | Petri | G06F 17/2229 |
| 2008/0256092 | A1* | 10/2008 | Kano | G06F 17/211 |
| 2008/0263101 | A1* | 10/2008 | Hara | G06F 17/2247 |
| 2009/0013244 | A1* | 1/2009 | Cudich | G06F 17/21 715/234 |
| 2009/0013267 | A1* | 1/2009 | Cudich | G06F 40/106 715/762 |
| 2009/0031401 | A1* | 1/2009 | Cudich | G06F 40/106 726/4 |
| 2009/0254811 | A1* | 10/2009 | Freiman | G06F 40/166 715/234 |
| 2010/0115394 | A1* | 5/2010 | Oshima | G06F 17/2247 715/234 |
| 2012/0151312 | A1* | 6/2012 | Clee | G06F 17/2235 715/205 |
| 2013/0007578 | A1* | 1/2013 | Shreck | G06Q 10/10 715/205 |
| 2014/0025619 | A1* | 1/2014 | Michelstein | G06F 17/211 706/47 |
| 2014/0025650 | A1* | 1/2014 | Lee | G06F 17/211 707/694 |

OTHER PUBLICATIONS

Communication pursuant to Article 94(3) for EP Application No. 14160413.2 dated Apr. 26, 2016, 6 pages.
PCT Search Report for PCT Application No. PCT/EP2015/052937 dated Apr. 23, 2015, 3 pages.
Written Opinion for PCT Application No. PCT/EP2015/052937 dated Apr. 23, 2015, 9 pages.

* cited by examiner

2001

| modification | type | tag code | presentation |
|---|---|---|---|
| insert | change | INS | example |
| delete | change | DEL | ~~example~~ |
| accept insertion | decision | INSACC | example |
| reject insertion | decision | INSREJ | ~~example~~ |
| accept deletion | decision | DELACC | ~~example~~ |
| reject deletion | decision | DELREJ | ~~example~~ |

2002

| modification | type | tag code | presentation |
|---|---|---|---|
| insert | change | INS | example |
| delete | change | DEL | ~~example~~ |
| accept insertion | decision | INSACC | example |
| reject insertion | decision | INSREJ | example |
| accept deletion | decision | DELACC | ~~example~~ |
| reject deletion | decision | DELREJ | ~~example~~ |

4001

| modification | fragment text with tags |
|---|---|
| Original text plus an insertion.<br><br>Old text to be deleted. | Original text plus an <INS, v=001, UID=145> insertion <END>.<br><DEL, v=002, UID=063> Old text <END> to be deleted. |
| Original text plus an insertion.<br><br>Old text to be deleted. | Original text plus an <INS, v=001, UID=145> <INSACC, v=003, UID=211> insertion <END>.<br><DEL, v=002, UID=063> <DELREJ, v=004, UID=966> Old text <END> to be deleted. |

FIG. 4

| modification | fragment text with tags |
|---|---|
| Original text plus an insertion.<br><br>~~Old text~~ to be deleted. | Original text plus an <INS, v=001, UID=145> insertion <END>.<br><DEL, v=002, UID=063> Old text <END> <DEL, v=003, UID=045> to be deleted <END><br><br>user level of awareness:<br>...<br>[UID=145, v=001]<br>[UID=063, v=002]<br>[UID=045, v=003]<br>*[UID=063, v=003]* |

FIG. 5

| ID 910 | belongs to 920 | type 930 | ind. level 940 | is headline <> 950 numbering | content 960 |
|---|---|---|---|---|---|
| 001 | | text | 1 | without | headline of first indenture level to be shown in the table of contents without numbering |
| 002 | | text | 1 | with | numbered headline of first indenture level |
| 003 | 002 | text | 2 | | text of second indenture level |
| 004 | 002 | text | 2 | with | numbered headline of second indenture level |
| 005 | 004 | text | 3 | | text of third indenture level |
| 006 | 004 | image | 3 | |  |
| 007 | 004 | text | 3 | without | headline of third indenture level to be shown in the table of contents without numbering |
| 008 | 004 | table | 3 | |  |
| 009 | 002 | text | 2 | with | numbered headline of second indenture level |
| 010 | 009 | text | 3 | | text of third indenture level |
| 011 | 002 | text | 1 | with | numbered headline of first indenture level |

FIG. 9

| indenture level | property | global formatting |
|---|---|---|
| 1 | headline with numbering | font=Calibri, size=18, bold, color=black, numbering_style="1", etc. |
| 1 | headline without numbering | font = Calibri, size=20, bold, color =black, etc. |
| 2 | normal text | font = Calibri, size =14, color = black, etc.. |
| 2 | headline with numbering | font = Calibri, size=14, bold, color = black, numbering_style ="1.1.", etc.. |
| 2 | headline without numbering | font = Calibri, size =14, italics, bold, color = black, etc. |
| 3 | normal text | font = Calibri, size =12, color = black, etc. |

FIG. 10

METHOD AND SYSTEM FOR EDITING VIRTUAL DOCUMENTS

CROSS-REFERENCE TO RELATED APPLICATIONS

This application claims priority to, and is a continuation of, PCT Application No. PCT/EP2015/052937, filed on Feb. 12, 2015, entitled "METHOD AND SYSTEM FOR EDITING VIRTUAL DOCUMENTS," which, in turn, claims the benefit of priority based on EP Application No. 14160413.2, filed on Mar. 18, 2014, both of which are hereby incorporated by reference.

TECHNICAL FIELD

The description generally relates to electronic data processing, and more particularly, relates to methods, computer program products and systems for document editing.

BACKGROUND

Standard editing tools can provide tracking modes for tracking a part of the change history of a document. For example, this may be used to facilitate collaborative editing of a document. Track changes can show if something was added to or deleted from a document. In addition or in the alternative, an identification of the person responsible for the changes can be typically stored with the track changes. However, in scenarios where many changes are applied by different users to the same document, often it becomes impossible to track the complete change history. Further, the change history of the document is typically visible for all users editing the document, which may not be a preferred option when working on documents having a confidential character. Further, with many changes applied to a large document it becomes more and more difficult for a particular user to identify relevant changes quickly.

SUMMARY

It may be advantageous to improve document editing systems with regards to their flexibility of handling large and complex documents and with regards to the accountability regarding changes and decisions to the document. A computer system, a computer implemented method and a computer program product as disclosed in the claims included herein can facilitate a flexible creation and change of documents that can be large and complex in structure.

A computer system for editing virtual documents can include a storage component that can store a plurality of fragments associated with a virtual document. The virtual document can have a logical structure and each fragment can be stored separately from the other fragments. A virtual document can be a document that does not need to be stored or persisted in its entirety for editing purposes. A virtual document can be dynamically composed or assembled from its fragments at runtime and visualized to a user. The visualization gives the user the impression to edit a complete document. However, in fact the visualization is only a view of the underlying fragments of the document.

A fragment may correspond to a headline of a document, a picture, a normal text portion and so on. For example, any piece of the virtual document which is in a way self-contained can be a fragment of the document. The logical structure of the virtual documents corresponds to a set of rules that are configured to evaluate the individual fragments in such a way that it becomes possible for the editing system to assemble all fragments of the virtual document in the correct order. The order relates to the arrangement or positioning of the fragments in space, for example, in top/down direction along a presentation medium such as a page or a display.

For this purpose, the computer system includes a processing component which is configured to assemble the virtual document by retrieving the plurality of associated fragments (e.g., from a fragments database in the storage component) and to order the plurality of associated fragments according to the logical structure of the virtual documents. Further, the computer system includes an editor component to present a visualization of the virtual document to a user for editing. The editing component can further receive editing commands from the user wherein such editing commands can be configured to modify a specific portion of the virtual document that corresponds to a specific fragment of the virtual document in the storage component. An editing command to modify the document may be directed to create or delete/deactivate a specific fragment, insert information into the specific fragment, or delete information from the specific fragment. Any change of existing content of a fragment can be composed from deleting and inserting information. As described herein, a fragment once created may not be deleted anymore. However, the fragment may be deactivated and moved into some kind of archive from which it may be reactivated anytime if the respective editing user is authorized to do so.

The use of the logical structure for the virtual document allows the computer system to perform consistency checks for guaranteeing that no modifications are applied to the virtual document that would risk the structural integrity and the logical consistency of the virtual document.

For this purpose, the computer system may load instructions of a computer program which, when executed by one or more processors of the computer system, execute the following method.

The computer system receives an editing command from a user where the editing command can be configured to modify the virtual document. The virtual document has the logical structure and the virtual document can be displayed to the user on any appropriate graphical output means (e.g., monitor, touch screen, etc.). The editing commands may be entered by the user using any appropriate input means such as a keyboard, a mouse device, a touch display, etc.

The computer system then determines that a fragment of the virtual document has an object type that complies with the received editing command. For example, in the case where the user indicates that a new image is to be inserted into the virtual document, the system creates a new fragment of the type image. If a new paragraph is to be inserted a corresponding fragment of type text may be created. If a headline is to be changed from an unnumbered to a numbered headline, the respective text fragment is determined in the plurality of already existing fragments.

Further, the computer system can determine a fragment dependency for the determined fragment if the determined fragment has a preceding fragment in the virtual document as a parent fragment. For example, if the editing command indicates to insert a standard text paragraph that relates to a previously created headline the system recognizes this dependency and can mark the newly created standard text fragment as a child of the previously created headline fragment by storing the parent's ID in the standard text fragment. Further, the fragment dependency for the determined fragment may be based on an indenture level associated with the determined fragment. Indenture level as used hereinafter, for example, can relate to the various technical structuring levels of the virtual document. An indenture level may not be limiting with regards to any need for a visual indenting in the presentation of the virtual document. Rather, an indenture level can be used to relate to any level associated with any hierarchy criterion that may be used for defining the structure of the virtual document.

The system checks the consistency of the fragment dependency with the logical structure of the virtual document. That is, the logical structure provides all rules for defining allowed relationships within the document. If the editing command is directed to a change of the virtual document infringes the logical structure of the virtual document then the consistency check would fail. If the consistency check fails, the system rejects the modification of the virtual document in accordance with the received editing command. That is, the system can automatically guarantee that no amendments are applied to the document that would go against the predefined logical structure. As a consequence, a user can never destroy the structure of the virtual document in a way that it makes no sense anymore.

The editor component enables insertion, deletion or any movement of fragments (horizontal and vertical) but at the same time prevents destruction of the logical structure if a modification would result in, for example, illogical numbering or undesired formatting. By using indenture levels in one implementation, the editor can ensure the repositioning of existing fragments in the virtual document is enabled for meaningful modifications. This may include the case where moving a particular fragment also results in the movement of all child-fragments. This may also include the case where deleting a fragment results in the deletion of all child-fragments.

If the consistency check is successful, the system stores the determined fragment as a separate database object in a fragment database together with the fragment dependency. As a consequence, fragments affected by a modification of the document are changed at the database level. This can allow a high level of granularity when tracking changes. Further, the changed parts can be retrieved from the fragment database when another user wants to review the virtual document including previous changes. This delta mechanism also saves processor performance when storing changes because only relatively small fragments are written to the database instead of the full document (as with standard document formats).

The system then visualizes the virtual document based on the current status of the fragment database and the logical structure of the virtual document. That is, fragments affected by successful modification editing commands can be updated at the visualization layer. Again, this saves processing resources and eventually bandwidth when users edit the virtual document remotely. The logical structure allows reducing complexity of document creation because hierarchical structuring of the virtual document can be combined with global formatting rules automatically ensuring logical consistency and appropriate formatting of the respective fragments.

In one implementation, the system can support filtering fragments of the virtual document based on at least one attribute of the fragments in the fragment database where at least one attribute controls the visibility of the at least one attribute for a particular user. This can provide a high degree of flexibility with regards to managing the virtual document in multi-user scenarios to provide individual views on the document for each individual user. Filtering functions can also be used for generating dashboards or other forms of reports providing aggregate views on a virtual document. Management summaries regarding the change history or the content may be generated by simply executing predefined filters with regards to the relevant attributes (e.g., show only fragments which are critical and have high priority).

In one implementation, if the consistency check is successful, the system inserts into the determined fragment version information which is associated with the modification applied in response to the editing command. The version information can be used for tracking the modification wherein the insertion is under the exclusive control of the computer system. In other words, a user cannot legally prevent the system from tracking any changes applied to the virtual document. Storing version information at the level of fragments allows fine granular versioning for every piece of the virtual document stored as a fragment. Version control mechanisms may not be applied to the entire document but may be applied to the various components from which the virtual document is dynamically composed. The system can then adjust the visual appearance of modified content in the presentation of the virtual document dependent on a modification type associated with the modification in response to the editing command. That is, each fragment includes its entire change history that can now be visualized to the user by appropriate visualization techniques as further detailed in the detailed description part.

In one implementation, the version information can include metadata with a version number and a user identifier of the user. The metadata may enclose content of the specific fragment that reflects the modification associated with the inserted version information. The metadata may be computer-readable or computer-parsable meta-data such as tags or any content descriptor that is delimited from the content and not to be rendered to the user. However, the metadata may affect rendering of the fragment as disclosed in the detailed description.

In one implementation, the storage component may further store for a particular fragment a level of awareness for the user when the user accesses the particular fragment. The level of awareness may include a user identifier of the user and a current version of the particular fragment. The level of awareness reflects the knowledge of a user during the user's latest view of the virtual document. For example, when the user returns to the virtual document after other users have modified certain fragments, the system can automatically apply a visualization filter that only presents changes to the user that occurred after his last view by comparing version information associated with the changes to the user's level of awareness.

Further aspects described herein will be realized and attained by means of the elements and combinations particularly depicted in the appended claims. It is to be understood that both, the foregoing general description and the following detailed description are exemplary and explanatory only and are not restrictive of the implementations as described herein.

BRIEF DESCRIPTION OF THE DRAWINGS

FIG. 4 is an example of fragment versioning.

FIG. 5 is an example of level of awareness visualization.

FIG. 9 illustrates an example of how fragments are stored in a fragment database.

FIG. 10 is a diagram of an example global formatting table that shows an example of how global formatting can be configured.

Like reference symbols in the various drawings indicate like elements.

DETAILED DESCRIPTION

Figure 1:
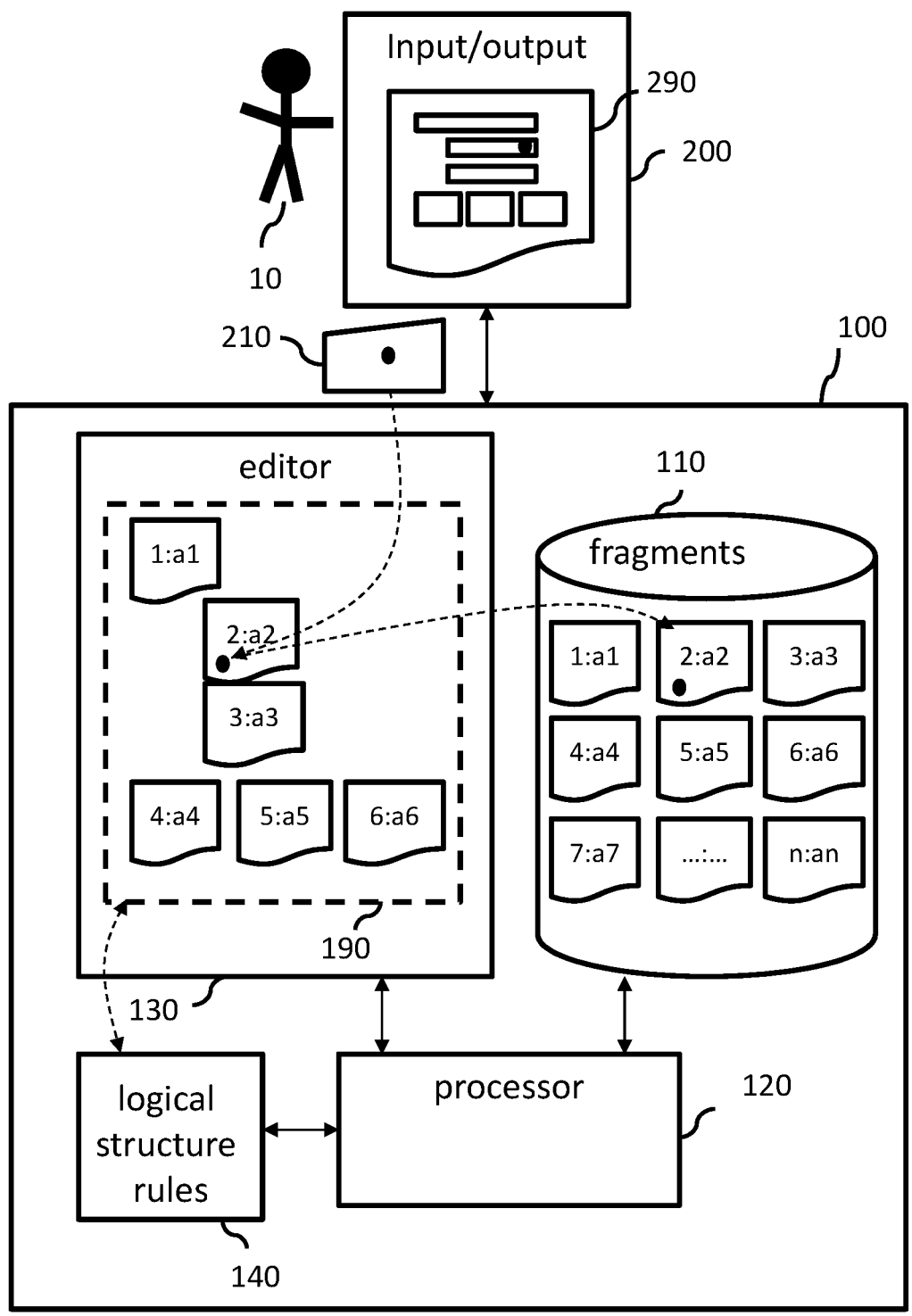
FIG. 1 is a block diagram of an example computer system for editing virtual documents.

FIG. 1 is a block diagram of an example computer system 100 for editing virtual documents 190. The computer system 100 is communicatively coupled with an input/output (IO) device 200. The IO device 200 can also be an integral part of the computer system 100 or it may remotely be connected to the computer system 100 through any standard communication interface. The IO device 200 can be used by a user 10 as a front end to edit a virtual document 190 by presenting a visualization 290 of the virtual document 190 to the user 10.

As described herein, a virtual document can be a document which is not persisted as a whole but which is dynamically assembled from fragments (one to n) which are stored in a storage component 110 of the computer system 100. The storage component 110 can be a conventional database, a file system or any other appropriate storage structure where each fragment can be persistently stored separately from the other fragments. The virtual document is associated with a logical structure 140 associating the respective fragments with the virtual document 190. The association may be implemented by references in the logical structure 140 to the respective fragment one to six. Such references may directly point to the identifiers of the respective fragments one to six. The references may also be based on annotations a1 to a2 of the respective fragments. The logical structure 140 includes a description of how the various fragments are part of the virtual document. This may include a hierarchy definition of fragments corresponding to various sections of the document. Any other document specific structuring element like paragraphs, headlines, titles, enumeration elements, etc. can be defined regarding their size and location.

In some implementations, at no point in time is there a need to persist the virtual document in the computer system as a single document for the purpose of editing the virtual document (snapshots of the virtual document may be created for other purposes but are not needed for the editing of the virtual document). Rather, the virtual document 190 can be assembled at runtime (when the virtual document is presented to the user) by a processing component 120 of the computer system. When the user 10 requests the visualization 290 of the virtual document 190, the processing component retrieves the respective associated fragments one to six and orders the fragments according to the logical structure 140 associated with the virtual document 190. An editor component 130 of the system can render the assembled fragments according to the logical structure 140 resulting in the requested visualization 290 that is sent to the IO device 200 (e.g., a client computer with an output component such as a display component). Thereby, the content of the fragments can be presented to the user like corresponding document elements of a complete single document. More details are disclosed with reference to FIG. 2.

The user 10 may now modify the virtual document 190 by interacting with the editor component 130 of the computer system through the IO device 200. For example, the user 10 can indicate a modification to be applied to any document element shown in the visualization 290. In the example, by using input means of the IO device 200 (e.g., mouse, touch screen, keyboard, etc.) the user indicates a change (illustrated by a black bullet) to the second document element. The IO device 290 sends the respective editing command 210 to the editor component to modify the corresponding fragment 2 of the virtual document 190 in the storage component 110.

The proposed system allows very flexible and granular management of tracking document modifications.

Figure 2:
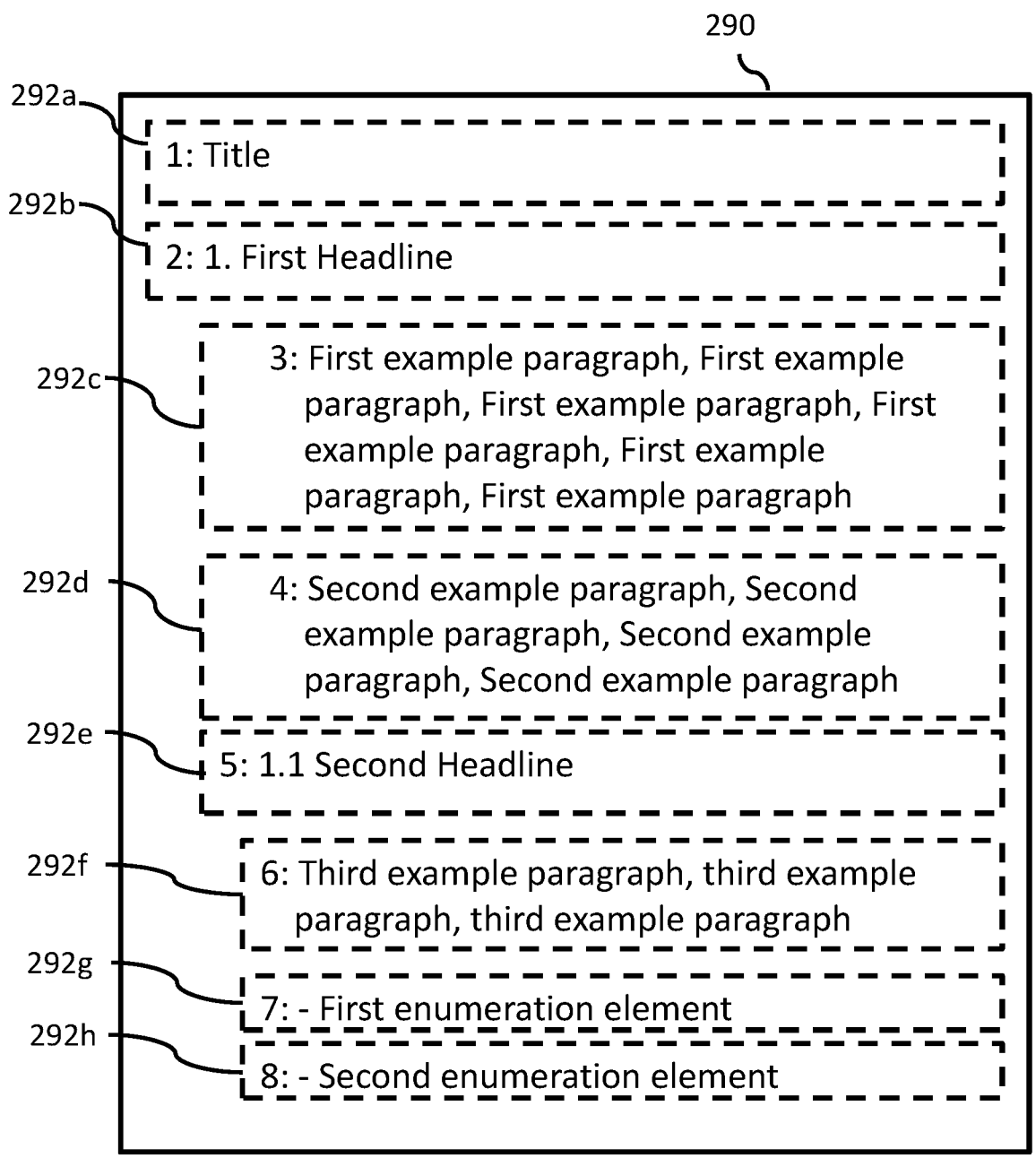
FIG. 2 illustrates example fragments associated with portions of a virtual document.

FIG. 2 illustrates fragments one to eight (fragments 292a-h) associated with portions of a virtual document. The example of FIG. 2 illustrates the visualization of the virtual document including seven document portions: a title, a first headline, a first example paragraph, a second example paragraph, a second headline, a third example paragraph, and an enumeration block with two enumeration elements. Such portions of the document are presented to the user as if they were part of a standard text processor document, such as for example, a MICROSOFT® WORD document or any other standard word processor document or any other document type, for example, presentation documents or publishing documents may be used as well. However, according to some implementations, each of the mentioned portions is associated with a corresponding fragment one to eight (fragments 292a-h) which is stored separately in the storage component of the computer system. The visualization 290 is a view on the respective fragments that is assembled according to the logical structure describing the virtual document. Fragment numbers 1:, 2:, 3:, 4:, 5:, 6:, 7:, and 8: in FIG. 2 are typically not shown to the user.

Each fragment one to eight (fragments 292a-h) can be associated with an object type. For example, object types can be but are not limited to, text object, picture object, image object, table object, etc. Any object type which is known from traditional text processing tools or graphical editing tools can be supported. Any fragment can have an object type different from the other fragments. Multiple fragments can have the same object type.

The logical structure may define logical dependencies and/or content dependencies between the fragments one to eight (fragments 292a-h) within the virtual document. For example, fragments may be positioned in the virtual document in an arbitrary number of indenture levels. Indenture level as used hereinafter can relate to the structuring of text documents. Also, the structure of a graphic oriented sheet (e.g., a presentation sheet) may have a logical structure (e.g., groupings, drawing levels, etc.,) which can be expressed through the use of indenture levels. In the example shown in FIG. 2, the indenture level is symbolized by the horizontal distance from the text portions to left margin. For example, the first fragment one (fragment 292a) is a title which is associated with the highest indenture level (shortest distance). The second fragment two (fragment 292b) is a first headline which also is associated with the highest indenture level.

The logical structure of the document includes a set of rules that define where a fragment is to be positioned in the virtual document for visualization. For example, such a rule may define that a title at the first indenture level is always preceding a numbered headline at the same indenture level. Therefore, the system uses the rule to identify an order that the fragments 292a-h need to be arranged. The logical structure can be complemented by definitions of parent-child relationships between fragments and corresponding indenture levels for fragments which are associated with subordinate indenture levels. This allows a user to define an error-free and logically correct structure for the fragments within the virtual document. For example, a particular fragment associated with a particular sub-level being a child of a superordinate parent level can be created if the parent level actually exists. In other words, the parent-child relationships defined by the logical structure provide a self-consistency check with regards to the integrity of the document structure in view of predefined consistency rules in the logical structure rule set. In the example, the first numbered headline fragment of second indenture level (fragment 5: second headline (fragment 292e)) can be created underneath the first indenture level numbered headline fragment (fragment 2: first headline (fragment 292b)).

A user can execute changes to the virtual document that result in fragments that do not violate the logical structure rules of the virtual document. For example, the fragment 5 (1.1 second headline (fragment 292e)) associated with the second indenture level of the virtual document can be created by the user if the corresponding first indenture level exists. There can be multiple fragments at the same indenture level (e.g., fragments 3, 4 and 5 (fragments 292c-e)). For example, fragment number four (fragment 292d) is at the same level as fragment number five (fragment 292e) but both are subsequent to fragment number two (fragment 292b). Therefore, the first headline (fragment two (fragment 292b)) is at the first indenture level. The first example paragraph (fragment three (fragments 292c)) and the second example paragraph (fragment four (fragments 292d)) as well as the second headline (fragment five (fragments 292e)) are at the second indenture level. Similar dependencies are defined for the fragments six to eight (fragments 292f-h) which are associated with the third indenture level.

As a consequence, a parent-child relationship between two fragments may be based on the corresponding indenture level relation. For example, the second numbered headline (fragment five (fragment 292e)) is a child of the first numbered headline (fragment two (fragment 292b)). The first example paragraph (fragment three (fragment 292c)) is also a child of the first headline (fragment two (fragment 292b)) and the relation is between the two corresponding indenture levels. Headline fragment five (fragment 292e) is to be positioned subsequent to the text paragraphs fragments three and four (fragment 292c-d) because of a corresponding rule in the logical structure of the virtual document. In addition, a fragment may store further dependencies that reflect the relationship with other fragments.

For example, a fragment may store positioning information that indicates where the fragment is to be positioned when the virtual document is assembled. Such positioning information can include the predecessor of a fragment or the successor of the fragment. For example, it may be recognized that fragment three ((fragment 292c) first paragraph) precedes fragment four ((fragment 292d) second paragraph). For example, if a third paragraph is inserted between the first and second paragraphs the corresponding newly created fragment may include a reference to its preceding fragment three (fragment 292c) and the succeeding fragment four (fragment 292d) would change its reference to the newly inserted fragment as the preceding fragment.

Any dependencies being defined between two or more fragments while those fragments are being created or modified by the user are automatically stored and administrated by the system in the fragment database (e.g., storage component 110, referring to FIG. 1). Details of the virtual document creation workflow are disclosed with reference to FIG. 7.

The editor component can enable a user to create or modify a virtual document by creating/modifying and continuously administrating the respective fragments as database objects in the fragment database without any need of programming knowledge or code writing.

Figure 3A:
FIGS. 3A and 3B illustrate visualization examples for various modifications.
Figure 3B:

FIGS. 3A and 3B illustrate visualization example implementations in a table 2001, and a table 2002, respectively, for various modifications. When the computer system receives a specific editing command to modify a specific fragment such a modification command may be directed to creating a whole new fragment.

For example, turning briefly to the example of FIG. 2 and assuming that the user is just adding the first and second enumeration elements that may not have been present before, the editor component may trigger the creation of respective new fragments seven and eight (fragments 292g-h) in the storage component. Further, the editor component may update the logical structure associated with the virtual document with the information that two additional elements (enumeration elements) have been added at the bottom location of the virtual document and that those additional elements are associated with the fragments seven and eight (fragments 292g-h). In other words, if the user indicates a modification which extends the virtual document beyond its current structure (logical structure editing command) then the editor component triggers the creation of one or more corresponding fragments in the database extending the logical structure of the virtual document accordingly.

The modification command may further be directed to inserting information into the specific fragment. Again referring to the example of FIG. 2, inserting information may include adding one or more characters to any of the paragraphs of the virtual document. The editor component can then initiate the corresponding modification of the fragment in the storage component (e.g., database).

The modification command may further be directed to deleting information from the specific fragment. Again referring to the example of FIG. 2, deleting information may include deleting one or more characters from any of the paragraphs of the virtual document. The editor component can then initiate the corresponding modification of the fragment in the storage component (e.g., database).

FIG. 3A shows a table 2001 illustrating an example implementation for visualizing modifications applied to fragments as well as for visualizing decisions applied to said modifications later on. Each modification has a modification type. Insert and delete modifications are of type change indicating that an effective change is applied to the content or structure of the virtual document. Accept and reject modifications are of type decision indicating that an applied change to the document can still be rejected or accepted by a user.

Each modification can be represented by a unique modification code (tag code column). The presentation column shows examples how the editor component can adjust the visual appearance of the modification content in the presentation of the virtual document dependent on the modification type for each modification. If an insert modification command is received (e.g., the user has inserted the word "example" into an existing paragraph), the modification can be tracked with the respective tag code INS at the fragment level. Any other appropriate tag code or tracking means may be used instead. For example, instead of tags, binary codes may be used. The tag code is interpreted by the editor as an instruction to adjust the presentation of the inserted part according to the modification and type in the visualization of the virtual document associated with the modified fragment.

In the example shown in FIG. 3A, an inserted string is underlined with a dotted line. In the example shown in FIG. 3B, in an alternative implementation, the inserted character is underlined by a solid line. Any other suitable presentation may be chosen. For example, color codes can be used instead so that an inserted string is displayed in a color (e.g., green) different from the previously existing text (e.g., black). Other presentations, for example different font sizes, font styles or animation effects (e.g., blinking) may be used instead. As shown in the table 2001 the delete modification (type change) (e.g., triggered by a delete modification command to delete the word "example" from a paragraph) can be tracked, for example, with the tag code DEL, at the fragment level. The presentation for the delete modification is a dashed line striking through the deleted content. In the table 2002 (referring to FIG. 3B), the presentation is a solid strike through line. Again, any other appropriate visualization can be chosen.

Modifications of type change can be seen as intended modifications which still require final approval by the same or a further user. Such approvals are also tracked by the computer system at the fragment level, therefore modifying the fragment accordingly. In other words, an approval decision is a fragment modification on its own. Such approval modifications can have a corresponding type (decision). Such decisions can finally accept or reject an intended insertion or an intended deletion. While standard document editing tools allow seeing if there is an intended modification or a decided modification, such tools may fail to track detailed decision history of such modifications.

In the table 2001, the accept insertion modification (tag code INSACC) is presented to the user by underlining the inserted string with a solid line. That is, the dotted underline from the insert modification is changed to a solid underline when the insertion is accepted by a user. If the user however rejects the insertion (tag code INSREJ), another presentation is shown to the user. In the example, the dotted underline is kept but, in addition, a solid strikethrough line indicates that the insertion is rejected. In standard editing tools, the final result may simply be a paragraph including the word "example" in the acceptance case and not including the word "example" in the rejection case. History tracking of the decisions leading to the final state may not be possible. This can be disadvantageous in collaborative editing scenarios where many users create many insert and delete modifications. Table 2002 shows an alternative presentation where decision modifications are presented with a frame around the modified element. An empty frame is used for accept decisions and a frame with a background pattern is used for reject decisions. Any other appropriate visualization, such as, for example, colored background or colored line styles may be used as well.

The same logic may be applied to the modifications related to the accept deletion decision and reject deletion decision as can be directly seen form the presentation column of the table 2001 and the table 2002. Instead of using a binary logic with the accept decision and the reject decision, other logic can be applied as well, for example, logic with further states, such as tentatively accept, definitively accept, tentatively reject, and definitively reject.

FIG. 4 is an example of fragment versioning. In the implementation shown in FIG. 4, the modification associated with a particular modification command causes insertion of corresponding version information into the particular fragment for tracking the modification wherein the insertion is under the exclusive control of the computer system. The insertion of version information under the exclusive control makes the system inert against any attempt of a user to manipulate or even forge the change history of a fragment. In the context of collaborative editing, the disclosed fragment versioning method provides an auditing proof method which is appropriate for the iterative creation of documents, such as for example, legal contracts, patent applications, or any other documents with a need to track change history, such as contacts. Table 4001 in FIG. 4 illustrates an example of stepwise modifications of a fragment indicated in the left column of the table 4001 and the respective fragment content including the version information by using history tags. The version information in a history tag includes a version number and a user identifier of the user causing the modification. Version information may further include a timestamp (date and time) indicating when the version information was created. For simplicity reasons timestamps are not included in the current example, as they are not needed for the basic versioning functionality.

A first modification relates to the insertion of the word "insertion" illustrated by the dotted underline. The respective fragment content is: "Original text plus an <INS, v=001, UID=145> insertion <END>." The inserted text is enclosed by a respective history tag pair: <INS, v=001, UID=145><END>. The opening tag includes the modification tag code INS, the version number v=001, and the user identifier of the modifying user UID=145. The inserted part "insertion" is enclosed by the start tag and it corresponding end tag <END>. The next modification is a deletion (dotted strike through) of the words "Old text" from the same fragment but through a different user (UID=063). The corresponding start tag including the modification tag code and the version information is: <DEL, v=002, UID=063>. The (to be) deleted portion "Old text" is delimited from the remaining content by the <END> tag. The users cannot influence the incrementing of the version number (v=002 for the second modification) with every modification of the fragment.

The next row of the table 4001 in FIG. 4 illustrates modifications of the decision type. The insertion caused by user (UID=145) is now accepted by a further user (UID=211). The acceptance of the insertion corresponds to a new modification that inserts new version information into the fragment. The corresponding start tag is inserted behind the earlier start tag of the original insert modification. The respective history tag <INSACC, v=003, UID=211> again includes the modification tag code INSACC, the new version number v=003 and the UID=211 of the accepting user. In the example, only one end tag is used to close both start tags. Additionally or alternatively, each start tag could be closed by a corresponding end tag. In a next step a still further user (UID=966) rejects the deletion of the (to be) deleted string "Old text". The presentation makes this immediately visible to any user looking at the visualization of the virtual document. In the example shown in FIG. 4, the presentation of FIG. 3A is used. The fragment is extended by a further history tag <DELREJ, v=004, UID=966> reflecting the reject delete modification DELREJ of the still further user UID=966 under the version number v=004.

The combination of cascaded version information in the fragment and the possibility of visualizing modification history information allows a full tracking of all modification ever applied to the fragment in an audit proof manner. In conventional document editing solutions modifications to be made can be visualized as long as they are not decided. Once decided (accepted or rejected) no change information is visible. To regain this information, for example, a user may be forced to perform compare operations on two different versions of the whole document. However, such a compare function can provide the changes but may not provide the information about who applied the changes to the document.

In other words, fragment versioning according to some implementations can enable tracking of the complete change and decision history of each fragment element (e.g., characters, strings, images, symbols, structure elements, etc.). Each modification of a fragment element can result in stepwise extension of the respective version information (e.g., by adding a corresponding history tag describing the modification applied to the fragment element in the step corresponding to the respective version ID or version number). The granularity of fragment versioning can allow differentiating between modifications of type change and decision, between users being responsible for the insertion of the history tags by the computer system, between different versions associated with the history tags, and optionally between timestamps associated with each history tag.

FIG. 5 is an example of level of awareness visualization. Because each history tag includes the version ID/number that corresponds to the respective modification it may be possible to present the visualization of each fragment for each user in such a way that a particular user immediately recognizes modifications applied to the document since the particular user viewed the visualization the last time. In other words, when the particular user views the visualization of the virtual document, and thereby the visualization of a particular fragment, the particular user obtains a corresponding level of awareness regarding the modification status of the fragment. Such level of awareness can be stored in the particular fragment for each user when viewing the particular fragment visualization. For example, the user level of awareness can be stored as a pair of the user's ID and the current version number of the fragment while the user is viewing the fragment. In table 5001 as shown in FIG. 5, a first user UID=145 has made an insert modification with version v=001. A second user UID=063 has made a delete modification with version v=002. A third user UID=341 has made a further delete modification with version v=003. Each time when the users have viewed the fragment (which is always the case when making a modification) a corresponding user level of awareness is stored in the fragment.

When the second user UID=063 views the fragment visualization again after the third user has made the delete modification with version v=003 the current user level of awareness for the second user is still at version v=002. That is, the second user is, at that time, not yet aware of the changes made by the third user. The editor component can take this into account when presenting the fragment content to the second user. For example, a modification made after the version corresponding to an awareness of a user can be highlighted in any appropriate way. In the example shown in FIG. 5, the modification corresponding to version v=003 is shown in bold letters with an enlarged font size. Color coding or animation techniques may be used as well. When the user views the fragment content the user specific level of awareness is updated for the third user to version v=003 [UID=063, v=003]. The update (illustrated in italics) can be added to the existing records of user level awareness or it can replace the existing user specific awareness record [UID=063, v=002] to keep the size of a fragment as small as possible. When later the second user reviews the fragment content without any further modification being applied, the presentation of modification associated with version v=003 will be presented according to the normal presentation rules for modification as laid out, for example, in FIGS. 3A and 3B.

Because the user is already aware of all modifications applied to the respective fragment, the user can immediately identify all modifications (changes or decisions) applied to a virtual document since the last time the user has reviewed the document. In other words, the proposed technical fragment versioning method facilitates the editing of documents especially in a collaborative editing scenario. Further, collaborative editing becomes more transparent and less error prone when applying fragment versioning according to implementations disclosed herein. A further advantage of the fragment versioning method is the possibility to quickly guide a user to those parts of the virtual document where actually modifications have been applied since the user's latest access to the document. Because the virtual document is assembled from fragments, the editor component may apply a filter to the visualization of the fragments based on the user level awareness records of each fragment. For example, fragments where modifications were applied since the last access of the user may be presented. This can substantially reduce the size of the presented visualization. For example, in collaborative editing of large documents having many pages only one paragraph may have been modified since the user's last access. Applying such a filter could result in a presentation of the fragment corresponding to the changed paragraph only. Additionally or alternatively, all fragments may be presented but fragments with new modifications may be highlighted in any appropriate way.

Figure 6:
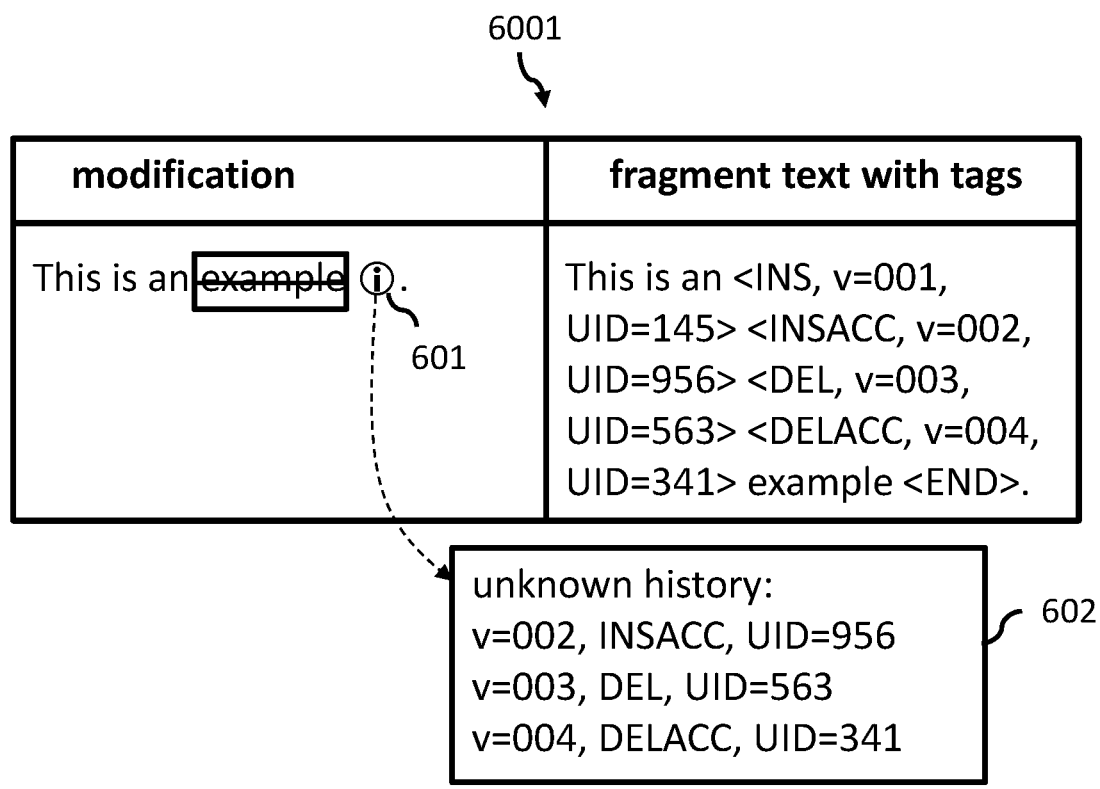
FIG. 6 is an example of history drill down for a fragment.

FIG. 6 is an example of a history drill down for a fragment. A further advantageous feature of fragment versioning is the possibility to instantly receive a complete drill down of the modification history for each element of a fragment. In the example shown in FIG. 6, because the system tracks all modifications for each fragment element within the fragment, a user has the possibility to review the complete modification history of each fragment. The disclosed visualization features herein allow visualizing a combined change and decision history with regards to the latest decision modification of the respective fragment element.

In the example shown in table 6001 in FIG. 6, four different users have applied modifications to the word "example". A first user inserted the word, a second user accepted the insertion, a third user deleted the word, and a fourth user accepted the deletion. If now the first user is reviewing the fragment content again, the editor may not only show that the word was deleted and the deletion was accepted. This can be achieved by the general visualization rules as shown, for example, in FIGS. 3A and 3B. Moreover, the editor component can present an additional indicator 601 (for example, an information symbol) next to the modified element that indicates to the user that a modification history drill down is available for this fragment element. The user may now select the drill down indicator 601 causing the system to provide a history list 602 with all modifications that have been applied to the fragment element. Additionally or alternatively, the history list 602 may include the track of unknown modifications, that is, modifications which were applied by other users. Additionally or alternatively, the history list 602 may only include the track of modifications since the last interaction of the user with the document.

Figure 7:
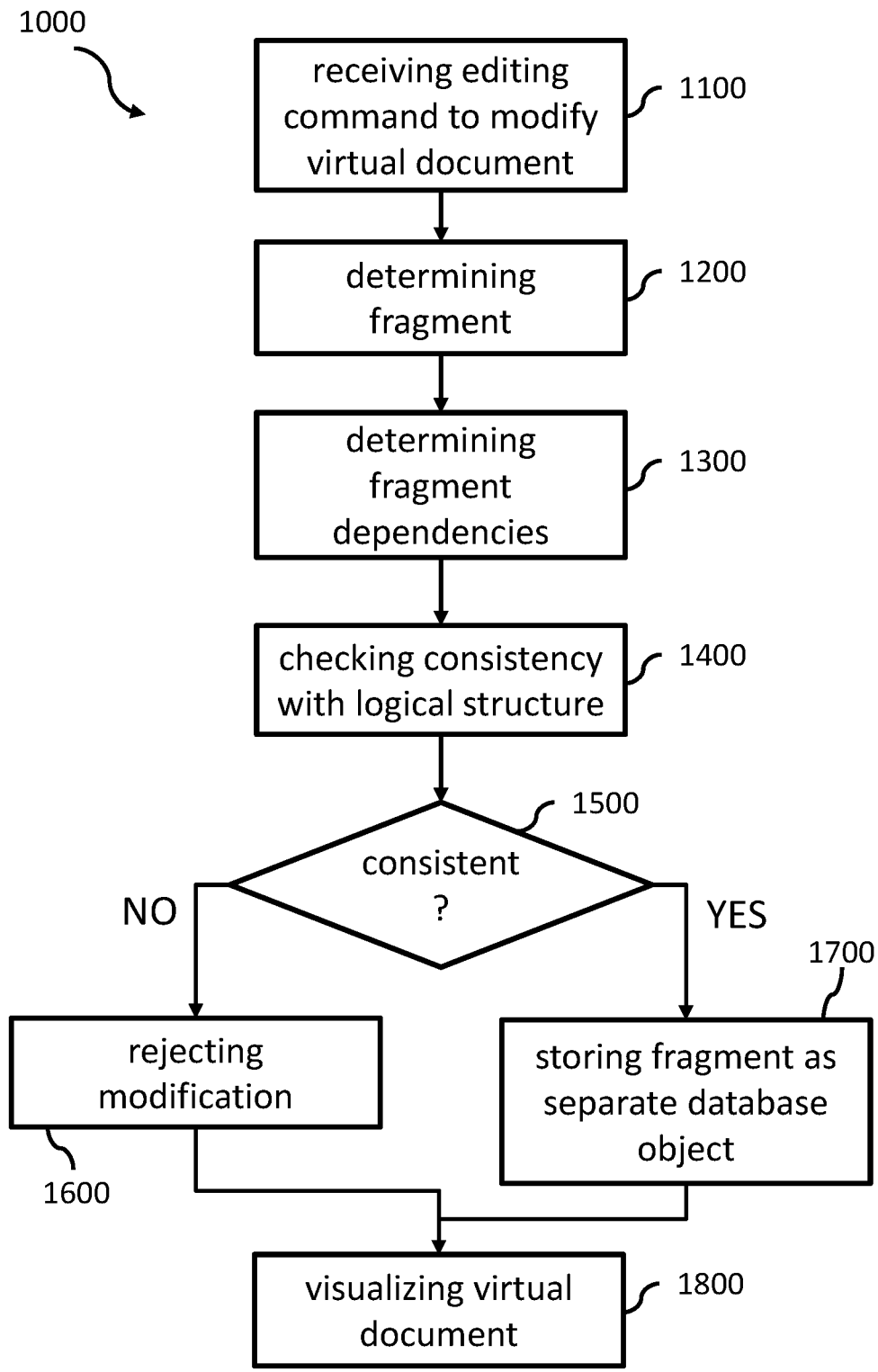
FIG. 7 is a flowchart of an example computer implemented method for editing virtual documents.

FIG. 7 is a flowchart of an example computer implemented method 1000 executed by a computer system (e.g., the computer system 100) for editing virtual documents. The computer implemented method 1000 can enable a user to modify a virtual document using the editor component of the computer system and to generate or adjust fragments in a fragment database where the fragments can be used to dynamically compose the virtual document at runtime.

The user can use the editor component to visualize and manipulate the virtual document. Thereby, the editor component may support any editing function known from conventional text or graphic editors. For example, an editing command can be received from the user through standard I/O means of the computer system (e.g., keyboard, mouse, touch display, etc.) (block 1100). The editing command may be directed to the modification of the currently displayed virtual document or it may relate to the creation of a new virtual document. For example, the user may push a particular key (e.g., RETURN, INS, DEL, etc.) or perform a respective menu function using a mouse device to indicate a desired modification of the virtual document to the computer system.

Thereby, the user may specify the object type of a fragment (e.g., text, image, table, etc.) which relates to the object to be modified. That is, documents may be composed from fragments corresponding to a text section, an image section, a table section, etc. Fragments may further have additional properties specifying further details of the fragment. For example, a text fragment may have the further property "numbered headline". A picture fragment may have the further properties "with flow text" or "in separate column". Such further properties can be evaluated by the logical structure rules to determine the positioning of the respective fragment in the virtual document. In a case where a new object is to be created in response to the editing command, the computer system determines a new fragment according to the specified object type that corresponds to the to-be-created element (block 1200). In a case where an existing object is to be modified, the computer system determines the corresponding affected fragment in the fragment database of the system (block 1200).

The computer system further determines fragment dependencies reflecting the logical structure of the virtual document (block 1300). In a case where a new fragment is created, the parent-child relationship with at least one previously created fragment is determined. More details regarding the logical structure information are disclosed herein with reference to FIGS. 8 and 9. For example, the user may determine the indenture level at which the to-be-created fragment will be positioned when a new fragment is to be created. This positioning may be changed at any time after the creation of the fragment. In this case, the already existing fragment may be moved around in the virtual document that may lead to a change in the dependencies. That is, the already existing fragment may receive a new parent fragment when being moved to another position.

However, the computer system can check the consistency with the logical structure rules of the virtual document (block 1400). For example, indenture levels of an existing fragment may be changed as long as the logical consistency of the virtual document is not violated. In other words, the editor component can reject any modification (e.g., moving) of a fragment which would destroy the logical consistency of the virtual document. For example, a fragment belonging to indenture level two can only be moved to indenture level three if, after the modification, there is still a fragment at indenture level two which precedes the moved fragment and can become the parent of the moved fragment. If only indenture level one and indenture level two fragments exist, the computer system can prevent a movement of such fragments to indenture level four as no valid parent would be available for the modified fragment(s).

In other words, if the consistency check (block 1500) results in an inconsistent structure of the virtual document (NO) the modification request of the user is rejected by the system (block 1600). On the other hand, if the consistency check (block 1500) results in a consistent structure of the virtual document the modified (created or changed) fragment is stored as a separate database object with its own object ID in the fragments database (block 1700). For example, this can include the storing of all determined fragment dependencies. That is, the parent-child relations defining the structure of the virtual document are stored together with the fragment content that allows flexible handling and fast composition of the virtual document based on the individual fragment database objects.

Once the editing command is completely processed by the editing system, the virtual document is visualized according to the current status of the fragments database (block 1800). That is, in case the modification was rejected by the system the virtual document is visualized as before receiving the editing modification command because no fragment changes were persisted in the fragment database. However, if the determined fragment is stored together with its fragment dependencies, the stored changes are taken into account when visualizing the virtual document. In other words, the modification becomes immediately visible to the user after the respective fragment changes have been stored in the fragment database.

Figure 8:
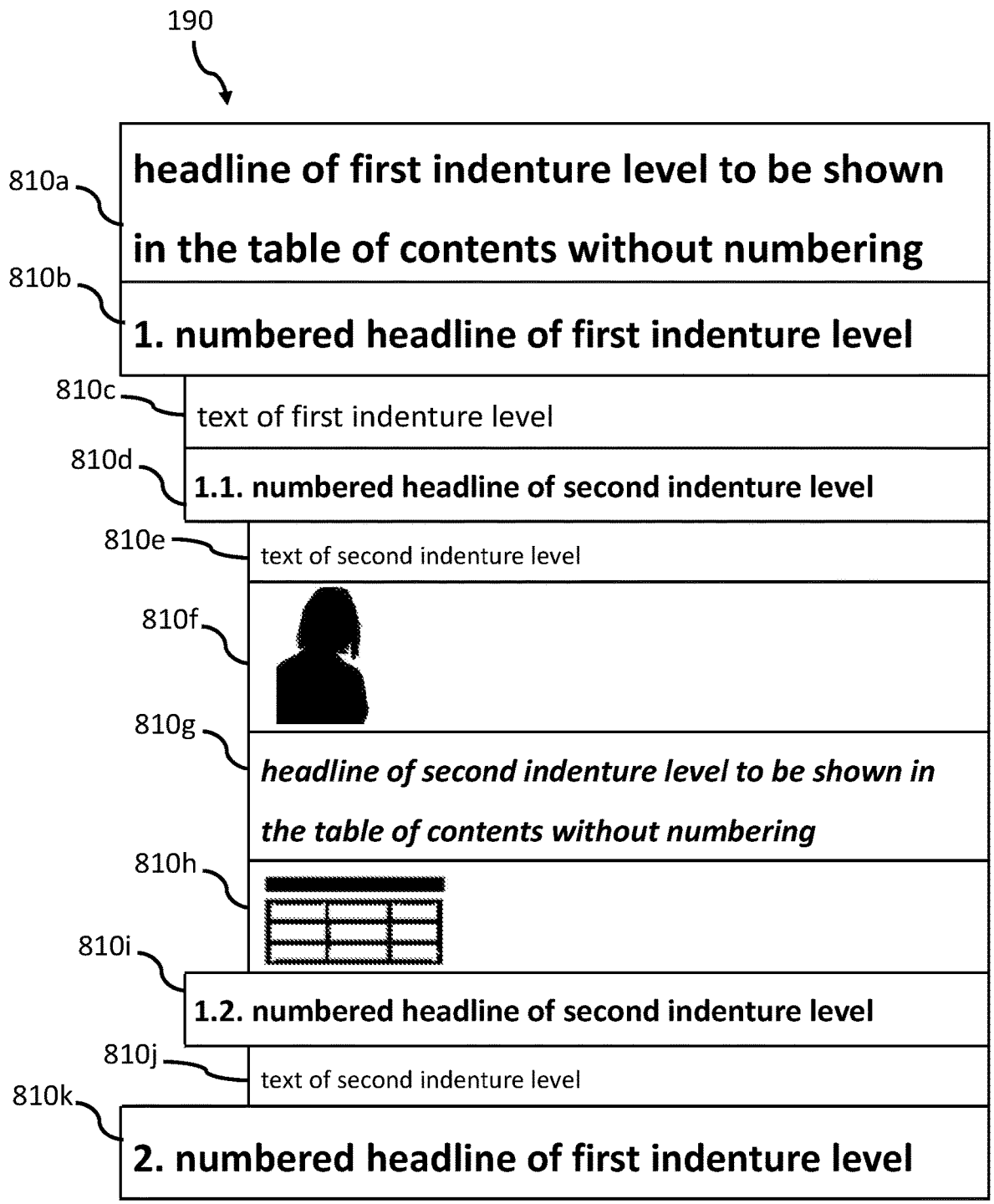
FIG. 8 shows an example of the logical structure of a virtual document.

FIGS. 8 and 9 show an example of the logical structure of a virtual document and how the respective fragments are stored in the fragment database, respectively. In the example shown in FIG. 8, each frame (frame 810a-k) corresponds to a fragment of the virtual document 190. A first (upper) frame (frame 810a) includes a headline of a first indenture level (root level) to be shown in the table of contents without numbering.

The corresponding fragment database object is shown in FIG. 9 as the database object with the ID=001. FIG. 9 shows an exemplary table 900 of the fragment database. Each fragment is a record of the table 900 with its own database object number (ID 910), a parent field (belongs to 920) for storing fragment dependencies, a type field (type) for indicating the type of the fragment, an indenture level field (ind. level 940) for assigning an indenture level to the fragment, a numbering indicator field (is headline <> numbering 950) for indicating if a headline should appear with numbering, and a content field (content 960) for storing the content of the fragment. The content field 960 also includes the versioning information for the fragment. Further properties may be added to a fragment database record. A different notation of fields of the fragment table and their field contents may be selected to achieve the same purpose. In the example shown in FIG. 9, the fragment with ID=001 has no parent which indicates that it is a root fragment of the virtual document. It is of type text, is at the first indenture level, and has the further property that it is a headline without numbering which causes its content to appear without numbering in the visualization of the virtual document.

The second frame in FIG. 8 (frame 810b) includes a numbered headline of the first indenture level. The corresponding fragment with ID=002 is shown in FIG. 9. This fragment is similar to the first fragment ID=001. However, it has the further property that it is a headline with numbering being responsible for the numbering "1." (referring to FIG. 8) in the visualization of the virtual document. Fragment ID=001 and fragment ID=002 are both positioned at the same indenture level (root level). There is no parent-child relationship between them. The positioning of the fragments in the virtual document is determined based on the additional properties of the fragments that are evaluated by the logical structure rules accordingly. In the example shown in FIG. 9, the logical structure rule includes that a text object being a headline without numbering precedes a text object being a headline with numbering.

The third frame in FIG. 8 (frame 810*c*) includes text in relation to the numbered headline in the second frame (frame 810*b*). The corresponding fragment ID=003 (referring to FIG. 9) is a text fragment which is at the second indenture level. The logical structure of the virtual document may have a rule that automatically creates a fragment for a standard text object subsequent to a headline at the indenture level that is subordinate to the indenture level of the headline. Therefore, fragment ID=003 is a child of fragment ID=002 at indenture level two that allows to position it correctly in the virtual document. The same is true for fragment ID=004, which is a text object with the additional property of a numbered headline. The logical rule set may include a rule that defines such a headline as succeeding a standard text object.

The fifth to eighth frames in FIG. 8 (frames 810*e-h*) are defining a sub-section of the previous fragment ID=004 which is illustrated by the respective indent. The corresponding fragments are defined as the data records from ID=005 to ID=008. The fragments associated with the indented sub-section of the virtual document all belong to indenture level three. Fragments ID=002 and ID=007 correspond to headlines with and without numbering, respectively. Fragment ID=006 is of type image with a picture of a person as its content and fragment ID=008 is of type table with a spreadsheet as its content. This illustrates the flexibility of the fragment database regarding any arbitrary type of object that can easily be included in the virtual document. To summarize, the parent-child relations can be used to define the relationship between a particular fragment and the respective parent fragment at the superordinate indenture level. For complex documents, this can relate a fragment to the correct place in the virtual document with regards to the parent node. The positioning inside the indenture level underneath the correct parent is then determined by using the logical structure rules of the virtual document in combination with the additional properties of the fragment.

Further examples for additional properties of a fragment are tags, ratings or priority settings, changes to the content, sequence numbers, etc. In some implementations, the fragment database as shown in FIG. 9 may further include a positioning field for each fragment. Such a positioning field can be used to store references to the predecessor and/or successor fragment(s) of the respective fragment. For example, a virtual document related to content with little structure information (e.g., a patent application) may have many subsequent fragments of the same type at the same indenture level and having the same additional properties (e.g., standard text paragraphs). In such implementations, the logical structure rules may not be able to guarantee a correct positioning of each fragment within the virtual document. The positioning field can be used to define a unique positioning within the virtual document for each fragment. In one implementation, the parent field (belongs to 920) may be used to store the predecessor and/or successor object ID of the respective fragment, thus creating a parent child relationship reflecting the exact positioning information. Note that in these implementations, a new fragment can be inserted between two existing fragments, and the references to the preceding or succeeding fragment can be added to the new fragment but may need to be updated in either the preceding or succeeding fragment dependent on the type of relationship used by the positioning field.

For each indenture level and/or for each additional property of a fragment, the editing system can define standard formats at a global level. For example, a global level as described herein can mean that central formatting information is available for any fragment. Examples of such global formatting information can include bit are not limited to, font, font size, font color, font style (e.g., bold, italics, underlined, etc.), visualization distance between subsequent fragment contents, indenture (from left or right), orientation, etc. The global formatting can be applied to each fragment based on the type of the fragment, the additional properties of the fragment, the positioning of the fragment in an indenture list, etc. For this purpose, rules which are similar to the logical structure rules may be used.

FIG. 10 is a diagram of an example global formatting table 1010 that shows an example of how global formatting can be configured. The example relates to the virtual document shown in FIG. 8 and the respective fragment definitions in the fragment database shown in table 900 in FIG. 9. Dependent on particular combinations of the fragment properties as defined in the fragment database for the various fragments, a computer system (e.g., the computer system 100 as shown in FIG. 1) can automatically determine the corresponding format information from the global formatting column.

For example, referring to FIG. 9, second fragment ID=002 is a text element and at the same time a headline with numbering which is assigned to the first indenture level. Therefore, the criteria of a second entry 1020 in the global formatting table 1010 are met by the second fragment ID=002 and the visualization (referring to FIG. 8, second frame 810*b*) is adjusted accordingly. That is, the content of the second fragment ID=002 is visualized by using the respective global formatting information "font=Calibri, size=20, bold, color=black, etc." The seventh fragment ID=007 is a text element and at the same time a headline without numbering which is assigned to the third indenture level. Therefore, the criteria of a fifth entry 1030 in the global formatting table 1010 are met by the seventh fragment ID=007 and the visualization (referring to FIG. 8, seventh frame 810*g*) is adjusted accordingly. That is, the content of the seventh fragment ID=007 is visualized by using the respective global formatting information "font=Calibri, size=14, italics, bold, color=black, etc.", and so on. The global formatting can allow a consistent formatting of the document without any burden of formatting considerations at the fragment level. Global formatting can also be used for automatic reformatting of fragments that are repositioned in the virtual document. The global format that corresponds to the new position is applied to the modified fragment.

The global formatting configuration can be overwritten by a user for any portion of a particular fragment. Further, a fragment in the fragment database may have further attributes that can be set, changed or deleted any time by the user while the virtual document is being created or modified. Examples for such further attributes can include, but are not limited to, priority (e.g., high, medium, low), content based assessment (e.g., good, neutral, bad), bookmark, follow-up and/or finished dates, user defined or pre-defined tags, conversations for any defined group of editing users (e.g., discussions, questions, tasks, etc.), links to other fragments of the virtual document or to URLs not being listed in the content area of the fragment, files being uploaded to the fragment while respective links are not listed in the content area of the fragment, etc. Such further attributes allow expanding the virtual document editor into a powerful collaborative editing tool that can be customized on demand according to the users' needs and the type of document.

The separate storage of each fragment as a database object in combination with the functions of the further attributes at the fragment level allow a fine granular control of the virtual document with regards to filtering the presentation content of the virtual document for individual users. This is achieved by setting visibility flags for one or more attributes with regards to individual users or user groups. For example, a content based assessment attribute (good, bad, etc.) may be flagged as visible for only for reviewers of the virtual document who are part of the same company. Users of another company cannot access this attribute content. For example, a user may define that only changes made by other users should be visible the user which allows the user to get a quick overview of the contributions of co-editing users. Such filter functions may be used individually by every user of the editing system to change the view on the virtual document for focusing on such attributes of the respective fragments that are of relevance to the individual user. The filter functions facilitate the localization and further processing of relevant fragments of the virtual document.

It may be useful to present aggregate views for selected filter criteria to a user. This may provide a simplified view on critical or important elements or fragments of a virtual dashboard. For example, it may be interesting to provide information about how many sections or fragments of the virtual document include undecided changes, how many sections have a certain valuation (e.g., red or green) and what is the respective priority (e.g., 0-3), and what is the ration between green marked and red marked sections.

Statistics on such aggregate data may be provided to the user in the form of graphical dashboards supporting data visualization techniques. For example, bar charts, pie charts, 3D graphics, line charts or any other appropriate diagram type to visualize the respective aggregate data may be used.

Method steps of the disclosed implementations can be performed by one or more programmable processors executing a computer program to perform functions of the implementations by operating on input data and generating output. Method steps can also be performed by, and apparatus of the disclosed implementations can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Such storage devices may also be provisioned on demand and be accessible through the Internet (Cloud Computing). Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the methods and systems described herein can be implemented on a computer having a display device, e.g., a cathode ray tube (CRT) or liquid crystal display (LCD) monitor, for displaying information to the user and an input device such as a keyboard, touchscreen or touchpad, a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in a computing system that includes a back-end component, e.g., as a data server, or that includes a middleware component, e.g., an application server, or that includes a front-end component, e.g., a client computer having a graphical user interface or a Web browser through which a user can interact with one or more implementations described herein, or any combination of such back-end, middleware, or front-end components. Client computers can also be mobile devices, such as smartphones, tablet PCs or any other handheld computing device. The components of the system can be interconnected by any form or medium of digital data communication, e.g., a communication network. Examples of communication networks include a local area network (LAN) and a wide area network (WAN), e.g., the Internet or wireless LAN or telecommunication networks.

The computing system can include clients and servers. A client and server are generally remote from each other and typically interact through a communication network. The relationship of client and server arises by virtue of computer programs running on the respective computers and having a client-server relationship to each other.

What is claimed is:

1. A computer system for editing virtual documents, comprising:
   a storage component that stores, in a fragment database, a plurality of fragments associated with a virtual document, the plurality of fragments being positioned at a number of indenture levels in the virtual document,
   the virtual document associated with logical structure rules associating respective fragments with the virtual document, wherein the logical structure rules include predefined consistency rules and define allowed relationships within the document for a self-consistency check of fragment dependencies with regard to the integrity of the virtual document structure in view of the predefined consistency rules, wherein each fragment is stored independently from other fragments as a separate database object in the fragment database, wherein each fragment is stored with positioning information that indicates where the fragment is to be positioned when the virtual document is assembled, the positioning information including reference to a predecessor of the fragment or a successor of the fragment, and wherein allowed fragment dependencies are stored with the respective fragments in the fragment database;

a processor that in conjunction with a memory assembles the virtual document by retrieving the plurality of associated fragments and by ordering the plurality of associated fragments according to the stored fragment dependencies and the logical structure rules, wherein the logical structure rules further define where a particular fragment is positioned in a visualization of the virtual document; and an editor component that:

presents the visualization of the virtual document to a user for editing; and receives editing commands from the user, wherein a specific editing command modifies a specific fragment of the virtual document in the fragment database, wherein any dependency being defined between the modified specific fragment and a further fragment in the fragment database is automatically stored in the fragment database and is continuously administered by the editor component as a database object in the fragment database, wherein the modification of the specific fragment is rejected if the self-consistency check fails, and wherein the modification by the specific editing command includes insertion of corresponding version information into the specific fragment of the virtual document for tracking the modification, and wherein the insertion is under an exclusive control of the computer system.

2. The computer system of claim 1, wherein the specific editing command is a modification command creating the specific fragment, a modification command inserting information into the specific fragment, or a modification command deleting information from the specific fragment.

3. The computer system of claim 2, wherein the editor component creates the specific fragment in response to an object creation editing command for extending the virtual document according to the logical structure rules.

4. The computer system of claim 1, wherein the version information includes metadata including a version number and a user identifier of the user, and wherein the metadata encloses content of the specific fragment that is representative of the modification and associated with the inserted version information.

5. The computer system of claim 1, wherein the specific editing command is of a modification type, and wherein the editor component adjusts a visual appearance of modification content in the presented visualization of the virtual document dependent on the modification type.

6. The computer system of claim 1, wherein the storage component stores, for a particular fragment included in the plurality of fragments, a last viewed version information for the user when the particular fragment is accessed by the user, and wherein the last viewed version information includes a user identifier of the user and a current version of the particular fragment.

7. The computer system of claim 1, wherein each fragment is assigned to an indenture level of the virtual document.

8. The computer system of claim 1, wherein fragments that are different from root fragments of the virtual document include a reference to a parent fragment.

9. The computer system of claim 1, wherein logical structure rules associated with the virtual document associate the plurality of fragments with the virtual document, wherein the logical structure rules define allowed relationships within the virtual document that are used to check a consistency of fragment dependencies, and wherein allowed fragment dependencies are stored with respective fragments included in the plurality of fragments.

10. The computer system of claim 9, wherein the processor orders the plurality of fragments according to stored fragment dependencies, wherein the logical structure rules further define, for each fragment included in the plurality of fragments, a respective position of the fragment in the visualization of the virtual document, and wherein the editor component rejects the modification of the specific fragment of the virtual document if a check of a consistency of the modified specific fragment fails.

11. A computer implemented method for editing a virtual document, comprising:

receiving, by a user interface included in a computer system, an editing command for modifying a virtual document being displayed to the user on a display device included in the computer system, wherein a plurality of fragments are associated with the virtual document, the plurality of fragments being positioned at a number of indenture levels in the virtual document, wherein each fragment is stored independently from other fragments as a separate database object in a fragment database, wherein each fragment is stored with positioning information that indicates where the fragment is to be positioned when the virtual document is assembled, the positioning information including reference to a predecessor of the fragment or a successor of the fragment, and wherein allowed fragment dependencies are stored with the respective fragments in the fragment database, wherein the virtual document has logical structure rules that associate respective fragments with the virtual document, and wherein the logical structure rules include predefined consistency rules and define allowed relationships within the document for a self-consistency check of fragment dependencies with regard to the integrity of the virtual document structure in view of the predefined consistency rules determining, by the computer system, that a fragment of the virtual document has an object type that complies with the received editing command;

identifying a fragment dependency for the determined fragment if the determined fragment has a preceding fragment in the virtual document that is a parent fragment;

determining whether a consistency check including checking the fragment dependency against the logical structure rules of the virtual document fails, the consistency check being the self-consistency check with regard to the integrity of the virtual document structure in view of the predefined consistency rules;

rejecting the modification of the virtual document in accordance with the received editing command based on determining that the consistency check failed;

inserting, into the determined fragment, version information of the modification of the virtual document by the editing command, the inserting being based on determining that the consistency check did not fail, the version information being for tracking the modification, and wherein the inserting is under exclusive control of the computer system;

automatically storing and continuously administering the determined fragment as an independent database object in a fragment database based on determining that the consistency check did not fail, the determined fragment including the determined fragment dependency; and visualizing the virtual document based on a current status of the fragment database ensuring appropriate ordering of the fragments by using the stored fragment dependencies and the logical structure rules, wherein the logical structure rules further define where a particular fragment is positioned in a visualization of the virtual document.

12. The computer implemented method of claim 11, wherein visualizing the virtual document further comprises adjusting a visual appearance of modified content in a presentation of the virtual document, the adjusting being dependent on a modification type associated with the modification, being performed in response to the editing command, and in response to determining that the consistency check did not fail.

13. The computer implemented method of claim 11, wherein determining the fragment dependency for the determined fragment is based on an indenture level associated with the determined fragment.

14. The computer implemented method of claim 11, wherein visualizing the virtual document further comprises filtering fragments of the virtual document based on at least one attribute of the fragments in the fragment database, the at least one attribute controlling a visibility of the at least one attribute for a particular user.

15. The computer implemented method of claim 11,
wherein logical structure rules associated with the virtual document associate the determined fragment with the virtual document, wherein the logical structure rules define allowed relationships within the virtual document that are used to check a consistency of fragment dependencies, wherein visualizing the virtual document further includes ensuring appropriate ordering in the virtual document of fragments included in the fragment database using stored fragment dependencies and the logical structure rules, and wherein the logical structure rules further define, for each fragment included in the fragment database, a position in the visualization of the virtual document.

16. A non-transitory computer program product that when loaded into a memory of a computing device and executed by at least one processor of the computing device executes the steps of:

receiving, by a user interface included in a computer system, an editing command for modifying a virtual document which has logical structure rules, the virtual document being displayed to the user on a display device included in the computer system, wherein the logical structure rules associate respective fragments with the virtual document, wherein a plurality of fragments are associated with the virtual document, the plurality of fragments being positioned at a number of indenture levels in the virtual document, wherein each fragment is stored independently from other fragments as a separate database object in a fragment database, wherein each fragment is stored with positioning information that indicates where the fragment is to be positioned when the virtual document is assembled, the positioning information including reference to a predecessor of the fragment or a successor of the fragment, and wherein allowed fragment dependencies are stored with the respective fragments in the fragment database, and wherein the logical structure rules include predefined consistency rules and define allowed relationships within the document for a self-consistency check of fragment dependencies with regard to the integrity of the virtual document structure in view of the predefined consistency rules;

determining, by the computer system, that a fragment of the virtual document has an object type that complies with the received editing command;

identifying a fragment dependency for the determined fragment if the determined fragment has a preceding fragment in the virtual document that is a parent fragment;

determining whether a consistency check including checking the fragment dependency against the logical structure rules of the virtual document fails, the consistency check being the self-consistency check with regard to the integrity of the virtual document structure in view of the predefined consistency rules;

rejecting the modification of the virtual document in accordance with the received editing command based on determining that the consistency check failed;

inserting, into the determined fragment, version information of the modification of the virtual document by the editing command, the inserting being based on determining that the consistency check did not fail, the version information being for tracking the modification, and wherein the inserting is under exclusive control of the computer system;

automatically storing and administering the determined fragment as an independent database object in a fragment database based on determining that the consistency check did not fail, the determined fragment including the determined fragment dependency; and visualizing the virtual document based on a current status of the fragment database ensuring appropriate ordering of the fragments by using the stored fragment dependencies and the logical structure rules, wherein the logical structure rules further define where a particular fragment is positioned in a visualization of the virtual document.

17. The computer program product of claim 16,
wherein logical structure rules associated with the virtual document associate the determined fragment with the virtual document, wherein the logical structure rules define allowed relationships within the virtual document that are used to check a consistency of fragment dependencies, wherein visualizing the virtual document further includes ensuring appropriate ordering in the virtual document of fragments included in the fragment database using stored fragment dependencies and the logical structure rules, and wherein the logical structure rules further define, for each fragment included in the fragment database, a position in the visualization of the virtual document.

* * * * *